United States Patent Office 3,202,478
Patented Aug. 24, 1965

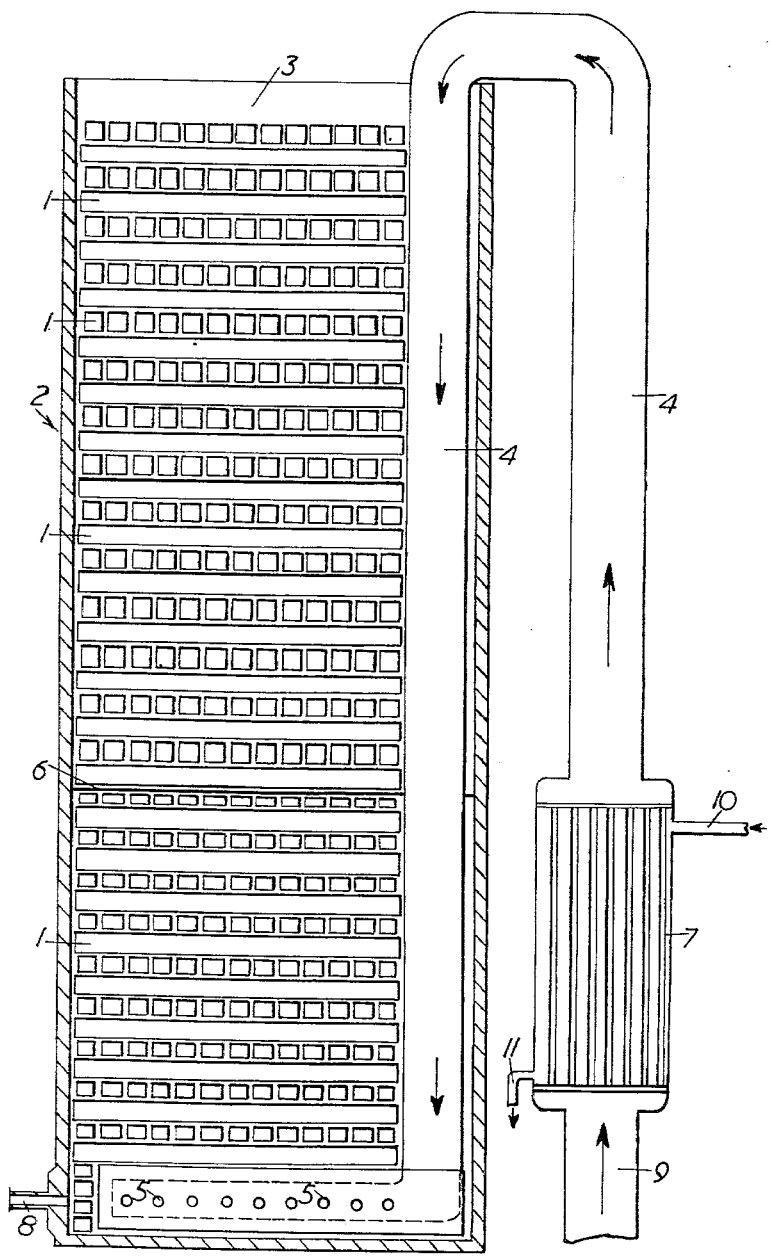

3,202,478
PROCESS FOR MANUFACTURING FUNGICIDAL MICRONISED TRIBASIC COPPER CHLORIDE
Arthur Hindle, Sharda Manubhai Raval, Sharda Dhirajlal Damani, Hasmukhrai Govindji Damani, and Kantilal Gulabrai Damani, all of 248 Samuel St., Bombay 3, India
Filed Nov. 28, 1960, Ser. No. 72,199
Claims priority, application Great Britain, Feb. 23, 1960, 6,346/60
4 Claims. (Cl. 23—97)

The correct chemical nomenclature for the compound of copper designated by the formula $CuCl_2 \cdot 3Cu(OH)_2$ is tribasic copper chloride, although in everyday commerce and trade it is generally termed copper oxychloride.

When tribasic copper chloride is manufactured by the common methods of chemical precipitation, such as by reacting nitrated cupric chloride with an alkali (e.g., sodium carbonate), the average particle size of the resulting precipitate after washing and drying is not less than seven microns. Such precipitates are universally employed as agricultural fungicides and, because of the relatively large average particle size of not less than seven microns, the fungicidal property of this compound is not—and cannot be—completely and effectively utilized.

The present invention provides a novel method of manufacturing micronised tribasic copper chloride, $CuCl_2 \cdot 3Cu(OH)_2$, (by which we mean that the average particle size of 66% of the compound is below three microns and it contains at least 58.5% copper) particularly, though not exclusively, for fungicidal purposes. Extensive field trials of the micronised tribasic copper chloride manufactured by the method of the present invention have proved it to be a far better and a much more effective agricultural copper fungicide than tribasic copper chloride manufactured by known chemical precipitation methods.

According to this invention there is provided micronised tribasic copper chloride, having the chemical formula $CuCl_2 \cdot 3Cu(OH)_2$, containing from about 58.5 to about 59.09% copper with 66% of the substance having a particle size below three microns. Further according to this invention there is provided process of preparing micronised tribasic copper chloride comprising treating previously prepared micronised tribasic copper chloride with a quantity of hydrochloric acid in accordance with the following reaction:

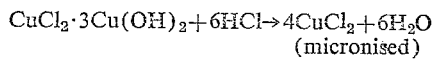
(micronised)

to form micronised copper chloride, adding water to the copper chloride so formed to obtain a strong solution thereof, bringing the said strong solution of copper chloride in contact with metallic copper and bubbling air through the solution having metallic copper in contact therewith, and after the air has been bubbled for some time and while it is still being bubbled, adding a small quantity of a basic catalyst selected from the group consisting of sodium carbonate, sodium hydroxide, ammonium carbonate and urea, to the metallic copper containing copper chloride solution, rapidly bubbling a large excess of hot air at about 80° C. therethrough, whereby micronised tribasic copper chloride is formed in suspension in the solution according to the following reaction:

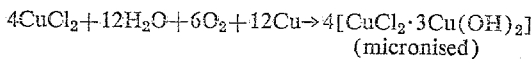
(micronised)

The invention also includes micronised tribasic copper chloride produced by the process substantially as described above. It is also within the scope of this invention to provide a composition of matter for use against fungicidal attack of plants which comprises micronised tribasic copper chloride and a carrier therefor. It is possible to include one or more fungicides and/or insecticides along with the instant one. Process of treating plants with fungicide of this invention comprises spraying the plants with same or a composition containing same.

Thus the raw materials required to carry out the process of this invention are:

(1) Metallic copper, in any form, preferably in the form of bars.

(2) Micronised tribasic copper chloride from a previous batch of the compound manufactured by the method of the invention or as hereinafter described.

(3) Hydrochloric acid of a strength of between about 5% and 32%, preferably about 20%.

(4) Water free from temporary hardness.

(5) A source of supply of a large volume of atmospheric air which should preferably be dust-free. The air is advantageously, though it is not essential, heated to a temperature of not less than 80° centigrade (176° F.). Air may be supplied under pressure for easy bubbling. A practical working pressure of about four pounds, or more, per square inch has been found satisfactory.

(6) An alkali catalyst such as sodium carbonate $Na_2CO_3$, or sodium hydroxide NaOH, or aqueous ammonia ($NH_4OH$), or any other basic nitrogen compound, e.g., urea or ammonium carbonate.

In order to explain the nature of the invention, reference is made to the accompanying drawing which illustrates, in diagrammatic form, a suitable apparatus for carrying out the method of the invention.

Bars of metallic copper 1 are placed criss-cross and end-wise, one upon the other, to form a column reaching to a height of say 8 feet from the bottom of an acid proof reactor 2 which is about 3½ feet in a diameter and 8½ feet tall and open at its top 3. These dimensions are not, of course, critical, but are suggested so that this allows the exhaustion of liquor which is being treated, without spilling over. Moreover it is necessary to keep the liquor in contact with the metallic copper at all times during the course of reaction, in order to keep its efficiency at a maximum. For this purpose the copper is stacked within the vessel throughout its substantial height, i.e., up to which point liquor level is likely to rise. The reactor 2 is fitted with lagged pipes 4 to lead pre-heated air under pressure into the bottom of the reactor 3 through hot air distributors 5 suitably spaced apart to ensure that the delivery of the pre-heated air under pressure is evenly distributed over the bottom surface of the inside of the reactor 2. A calculated quantity of washed micronised tribasic copper chloride, taken from a manufactured previous batch by this invention (or as hereinafter described), is placed in the reactor 2 and a calculated quantity of the hydrochloric acid is then also added to the reactor 2 whereupon the following reaction takes place,

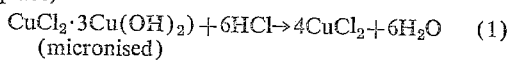 (1)
(micronised)

Water is then run into the reactor 2 until the total height of the resultant strong solution of formed $CuCl_2$ within the reactor, shown by reference numeral 6, is not more than about three feet from the bottom thereof. The delivery air, under pressure but preferably not preheated, to the bottom of the reactor is then turned on, when the air bubbles up and through the solution and bars of metallic copper 1 to escape to the atmosphere through the open top 3 of the reactor 2. After approximately one hour's running and with the air under pressure still being delivered to the reactor 2, between 0.05% and 0.1% of sodium carbonate $Na_2CO_3$ in aqueous solution (based on the total quantity of the solution of $CuCl_2$ in the reactor 2) is added to the solution in the reactor, whereupon the following reaction commences, $$(4CuCl_2) + 12H_2O + 6O_2 + 12Cu \rightarrow 4(CuCl_2 \cdot 3Cu(OH)_2) \quad (2)$$
$$\text{(micronised)}$$

The air heater 7 is then turned on (if not already running on heat) and delivery of pre-heated air under pressure to the reactor 2 is continued until test samples taken at intervals of time from the solution within the reactor show, by comparison with each other, that the reaction according to Eq. 2 has practically ceased, or has reached its economic limit. When this occurs, sodium carbonate in aqueous solution is added to the solution in the reactor 2 in order to neutralize the small quantity of residual copper now remaining in solution as $CuCl_2$, since the reaction indicated in Eq. 2 will not proceed entirely to completion unless the running time is uneconomically prolonged. The weight of sodium carbonate required for this purpose will not usually exceed 5% of the total weight of the micronised tribasic copper chloride already formed in the reactor 2 by the preceding chemical reactions. The liquor, containing the micronised tribasic copper chloride in suspension and approximately 6% of sodium chloride in solution, is now discharged from the reactor through a delivery pipe 8 and run into suitable filters for washing, drying and the like in known manner.

The air-heater 7 may be of conventional design, including an inlet 9 for admitting dust-free atmospheric air under pressure, a source of supply 10 of heat-energy (e.g., steam, hot water, hot waste gases) and an outlet for waste 11. The heater 7 may of course be heated in any desired manner, such as electrically.

The quantity of micronised tribasic copper chloride manufactured by the novel method of the invention is approximately four times the quantity of micronised tribasic copper chloride added to the reactor at the commencement of operations. Clearly, if X units of micronised tribasic copper chloride are added to the reactor to commence operations, the yield of micronised tribasic copper chloride at the conclusion will be 4X units. Since, however, from this 4X units, X units must always be returned to the reactor in order to repeat the process, the net yield, or quantity manufactured, is 3X units each time the reactor is discharged on completion of the process described above. This is clearly indicated in Eqs. 1 and 2 from which it will be seen that, theoretically, for each equimolar quantity of micronised tribasic copper chloride added to the reactor (see Eq. 1, four equimolar quantities are yielded (see Eq. 2).

In order to start the process in the first instance, and thereafter to repeat it, an initial quantity of micronised tribasic copper chloride must be made. This can be done by taking a given molar quantity of ordinary tribasic copper chloride (i.e., as manufactured by the known method of chemical precipitation) and adding thereto the molar quantity of hydrochloric acid required to bring it into solution.

$$CuCl_2 \cdot 3Cu(OH)_2 + 6HCl \rightarrow 4CuCl_2 + 6H_2O \quad (3)$$

If one attempts to oxidise the resulting solution of $CuCl_2$ to tribasic copper chloride by passing therethrough either cold or heated atmospheric air under pressure and bubbling such air from the bottom upwards through the solution in which are immersed bars of metallic copper, only an extremely slow reaction takes place and the solution therefore changes only very slowly, while the product thus obtained is of a relatively coarse nature, since it is not micronised. If, however, a small quantity of a suitable soluble catalyst is added to the solution, the reaction will take place to form micronised tribasic copper chloride when air is passed into the solution in the manner described. A suitable catalyst is ammonium hydroxide $NH_4OH$, containing approximately 0.1% by weight of $NH_3$ based on the weight of $CuCl_2$ in the aqueous solution. Other compounds of ammonia, such as $(NH_4)_2CO_3$, $CO(NH_2)_2$, may be used in place of ammonium hydroxide $NH_4OH$. The following reaction will then take place when air is passed into the solution as described, $$CuCl_2 + 3H_2O + 1\tfrac{1}{2}O_2 + 3Cu \rightarrow CuCl_2 \cdot 3Cu(OH)_2 \quad (4)$$

The resulting insoluble tribasic copper chloride is "micronised" and, after decanting and washing, can be used to carry out the method of manufacture described hereinabove. For all subsequent manufacture in the reactor, no further ammonium hydroxide or other compound of ammonia is required. Between 0.05% and 0.1% of sodium carbonate $Na_2CO_3$ is used instead in the manner already described hereinabove. The ammonium catalyst is employed once only (to start the plant working) and, since micronised tribasic copper chloride for all subsequent manufacture is abundantly available, the ammonium catalyst is never used again. The reason for this change of catalyst is that the micronised tribasic copper chloride formed when sodium carbonate is used as a catalyst possesses an even higher percentage than 66% of particles of a size less than three microns, thus giving the product even greater fungicidal activity than when an ammonium catalyst is used.

For electro-chemical reasons, the column of bars of metallic copper 1 inside the reactor 2 (all of which, since they rest upon each other, are in electrical contact) must, in addition to being immersed in the solution of $CuCl_2$ in the reactor, also be exposed to the air above this solution, i.e., above the level 6, in order that the reaction may proceed efficiently. It has been found that for every 1′0″ depth of bars of metallic copper immersed in the solution, 1′8″ to 2′0″ of the bars should be exposed to the air inside the reactor above the solution. The ratio is of the height of the immersed bars to the height of the exposed bars therefore, approximately 1:1.8. New bars of metallic copper are added to the top of the column as the bars already in the reactor become used up.

*Example*

200 lb. of micronised tribasic copper chloride were put into the reactor. To this, 340 lb. of commercial hydrochloric acid containing 30% of HCl were added to the reactor, water being added to bring the level of the solution up to 3′0″, thus producing a strong aqueous solution of micronised $CuCl_2$ in the reactor. The pre-heated air delivery to the reactor was started and, after one hour's running time and with the pre-heated air still being delivered to the reactor, 1 lb. of sodium carbonate in aqueous solution was added as a catalyst to the solution of micronised $CuCl_2$ in the reactor, when the reaction indicated in Eq. 2 commenced. The pre-heated air delivery was continued for a further three hours (making a total of four hours running time) when test samples taken from the solution in the reactor showed that the reaction had proceeded as far as was practicable. With the pre-heated air still being delivered to the reactor, 15 lb. of sodium carbonate in aqueous solution were then added to the (now very weak) aqueous solution of $CuCl_2$ in the reactor, when the following reactions took place, $$2CuCl_2 + 2Na_2CO_3 + H_2O \rightarrow Cu(OH)_2 \cdot CuCO_3 + 4NaCl + CO_2 \quad (5)$$

$$2CuCl_2 + 3(Cu(OH)_2 \cdot CuCO_3) + 3H_2O \rightarrow 2(CuCl_2 \cdot 3Cu(OH)_2) + 3CO_2 \quad (6)$$

thus precipitating a very small quantity (approximately 20 lb.) of ordinary (i.e., not micronised) tribasic copper chloride. The reactor was then discharged, the micronised tribasic copper chloride washed, dried and weighed, and found to be 710 lb. Therefore, the actual, or net, yield was 710−200=510 lb. After drying, and when analysed, the copper content of this batch of micronised tribasic copper chloride was found to be 58.9% and the chlorine content was found to be 16.53%, the hydrochloric acid and sodium carbonate consumption being respectively 0.68 lb. and 0.033 lb. per lb. of micronised tribasic copper chloride manufactured.

It will be evident that to carry out this process, the acid-proof reactor can be of any size provided the fundamental conditions are fulfilled. The acid-proof reactor as described hereinabove is 8′6″ tall and 3′6″ in diameter, with an open top, can manufacture 2,040 lb. of micronised tribasic copper chloride containing 58.9% of copper per day of twenty working hours (five hours per batch). (A total of one hour is required for charging and discharging the reactor.) This reactor forms part of a small pilot plant from which the foregoing data has been obtained. It will also be evident that long acid-proof channels, filled with bars of metallic copper and fitted for preheated air delivery, and of any desired depth, width and length, can be used to carry out this process, the strong solution of micronised $CuCl_2$ entering at one end of such channels, the micronised tribasic copper chloride thus manufactured in its passage through the channels leaving at the other end of the channels, in suspension in the weak micronised $CuCl_2$, for further treatment.

The volume of pre-heated air required to carry out this process is many hundreds of times greater than—or in excess of—the theoretical requirement of the oxygen content indicated in Eq. 2.

Analysis of our technical grade of micronised tribasic copper chloride shows a copper content (Cu) of 59.09%. This percentage of copper content, a close approximation to the theoretical, has never before been achieved, even for the laboratory reagent quality of this compound. The ordinary commercial quality shows a maximum copper content of 57.5%. Size analysis of our product shows that 66% of the particles thereof are below three microns. These two results were obtained from micronised tribasic copper chloride manufactured in the reactor using an ammonium catalyst (Eq. 4). Using sodium carbonate as a catalyst (Eq. 2), we have evidence that the percentage of particles of a size below three microns is much greater.

It has already been recognised, when proposing the use of copper oxychloride as a fungicide in agriculture, that the smaller the particle size of this compound of copper the greater would be its fungicidal activity in addition to its greater covering power. Constant research finally showed that this theoretical desiderata was possible in practice and the copper oxychloride manufactured according to our invention, specifically for use as an agricultural fungicide, admirably fulfills all the desired requirements of extremely small particle size, maximum covering power and high fungicidal activity.

Laboratory tests clearly indicate that the product of this invention is of extreme fineness and, in addition to its greater and more uniform covering power, it has not been found to cause blockage of nozzles during spraying. In our carefully prepared formulations we use adhesives to give adequate sticking power. In addition to this, further adhesion is also secured in Microcop itself, since its micronised fineness renders it very resistant to the heaviest rainfall when applied to foliage. It will be evident from the foregoing that less Microcop need be applied than the normal recommended dose.

The world's most effective fungicide

Microcop is a wettable powder containing not less than 50% of metallic copper in the form of our Microcop copper oxychloride, $CuCl_2 \cdot 3Cu(OH)_2$. Microcop is a concentrated fungicide which man be mixed with dusts and which, on the mere addition of water, results in a ready-for-use spray effective against a variety of plant diseases affecting tea, coffee, rubber, grapevine, tomatoes, potatoes, tobacco, etc. Its extremely fine micronised particle size and the incorporation of suitable spreading and adhesive agents, ensure uniform coverage, high fungicidal activity and marked resistance to rainfall, even under the most severe conditions.

It is much easier to prepare and apply than Bordeaux mixture, since it is a free flowing powder and it is ready for immediate use by stirring into water and will not settle out during spraying. It is also much less corrosive to spray nozzles, and will not cause blockage.

The following are some of the crop diseases which can be controlled by Microcop. The concentrations of Microcop given, in lbs. per 100 gals. water, are for use with high volume sprayers, at a rate of 100 gals. spray per acre, unless otherwise stated. If low volume equipment is employed, the concentration should be adjusted to suit the sprayer by reducing the amount of water.

| Crop | Disease | Lbs. per 100 Gals. water | Remarks—gals. per acre |
|---|---|---|---|
| Banana | Leaf spot (*Cercospora musae*). | 3 | 150–200 |
| Betele vine | Wilt disease (*Phytophthora sp.*). | 2½ | |
| Cumin | Blight | 3½ | |
| Cotton | Angular leaf spot | 3½ | |
| Citrus | Black spot (*Diplodia natalensis*). | 2 | |
| | Brown rot (*Botrytis cinerea*). | 3 | |
| | Melanose (*Phomopsis citri*). | 2 | |
| | Nail head rust (*Cladosporium herbarum*). | 2 | |
| | Scab (*Sporotrichum citri*) | 3 | |
| Coffee | Leaf rust or leaf disease (*Hemeleia vastatrix*). | 2½ | 150–400 |
| | Black rot (*Corticium koleroga*). | 2½ | |
| | Anti leaf-fall or tonic spraying. | 7 | 120 |
| Onion | Downy mildew (*Perenospora-schleedeni*). | 2 | |
| Peach | Leaf curl (*Taphrina deformans*). | 5 | |
| | Brown rot (*sclerotinia fructigena*). | 3–5 | |
| | Shot hole (*Clasterosporium carpophilum*). | 2 | |
| Potatoes | Early blight (*Alternatia solani*). | 3–5 | |
| | Late blight (*Phytophthora infestans*). | 4–5 | |
| Rubber | Phytophthora leaf-fall | 2 | |
| Tea | Blister blight (*Exobasidium vexans*). | 1 6 [1] | 10–15 |
| | Black rot (*Corticium invisum*). | 4 | 150–350 |
| | Red rust (*Cephaleurus parasiticus*). | 2½ | |
| Tobacco | Downy mildew or blue mold (*Perenospora tabacina*). | 6 | |
| | Frog-eye (*Cercospora nicotianae*). | 4 | |
| | Wildfire (*Pseudomonas tabaci*). | 4 | |
| | Angular leaf spot (*Pseudomonas angulata*.). | 4 | |
| | Brown spot (*Alternaria longipes*). | 4–5 | |
| Tomatoes | Early blight (*Alternaria solani*). | 3 | |
| | Late blight (*Phytophthora infestans*). | 3–4 | |
| Vines | Downy mildew (*Plasmopara viticola*). | 5 | |
| | Anthracnose (*Cleosporium ampelophagum*). | 2–3 | |
| | Bacterial blight (*Erwinia vitivora*). | 4 | |

[1] Ounces water.

The powder is harmless to handle and it is completely non-toxic to personnel employed on spraying or to foliage. It will retain its effectiveness indefinitely if stored in a dry place.

Fungicide of this invention can be mixed with lead arhenate, calcium arsenate, rotenone, pyrethrum, DDT, BHC, chlordane, Toxaphene, parathion, Malathion, aldrin, dieldrin, sulphur, lime and winter oils.

It is also compatible with summer oils and nicotine but care must be taken in the formulation of any such mixtures.

It is not compatible with tar oils, lime-sulphur, or fluosilicates.

Having now particularly described and ascertained the invention in the foregoing specification what we claim is:

1. Process of preparing micronised tribasic copper chloride comprising treating tribasic copper chloride with hydrochloric acid in accordance with the following reaction:

$$CuCl_2 \cdot 3Cu(OH)_2 + 6HCl \rightarrow 4CuCl_2 + 6H_2O$$

to form copper chloride, adding water to the copper chloride so formed to obtain a solution thereof, bringing the said solution of copper chloride in contact with metallic copper and bubbling air through the solution having metallic copper in contact therewith, and while the air is being bubbled adding 0.05 to 0.1% based on the total quantity of copper chloride present in the liquor to be treated, of a basic catalyst selected from the group consisting of sodium carbonate, sodium hydroxide, ammonia, ammonium carbonate and urea, to the metallic copper containing copper chloride solution, rapidly bubbling a large excess of hot air at about 80° C. therethrough, whereby micronised tribasic copper chloride is formed in suspension in the solution according to the following reaction:

$$4CuCl_2 + 12H_2O + 6O_2 + 12Cu \rightarrow 4[CuCl_2 \cdot 3Cu(OH)_2]$$

at least 66% of said tribasic copper chloride having an average particle size below 3 microns.

2. Process of preparing micronised tribasic copper chloride comprising treating tribasic copper chloride with hydrochloric acid in accordance with the following reaction:

$$CuCl_2 \cdot 3Cu(OH)_2 + 6HCl \rightarrow 4CuCl_2 + 6H_2O$$

to form copper chloride, adding water to the copper chloride so formed to obtain a solution thereof, stacking the ratio of the height of stacked metallic copper within the liquor to its height above the liquor being about 1:1.8 to about 1:2, air through the liquor having metallic copper in contact therewith for some time and while it is still being bubbled, adding a basic catalyst selected from the group consisting of sodium carbonate, sodium hydroxide, ammonia, ammonium carbonate and urea, to the metallic copper containing copper chloride solution, rapidly bubbling an excess of hot air at about 80° C. therethrough, whereby tribasic copper chloride is formed in suspension in the solution according to the following reaction:

$$4CuCl_2 + 12H_2O + 6O_2 + 12Cu \rightarrow 4[CuCl_2 \cdot 3Cu(OH)_2]$$

at least 66% of said tribasic copper chloride having an average particle size below 3 microns.

3. Process of preparing micronised tribasic copper chloride comprising treating tribasic copper chloride with hydrochloric acid in accordance with the following reaction:

$$CuCl_2 \cdot 3Cu(OH)_2 + 6HCl \rightarrow 4CuCl_2 + 6H_2O$$

to form copper choride, adding water to the copper chloride so formed to obtain a solution thereof, bringing the said strong solution of copper chloride in contact with metallic copper and bubbling air through the solution having metallic copper in contact therewith, and while the air is being bubbled, adding a basic catalyst selected from the group consisting of sodium carbonate, sodium hydroxide, ammonia, ammonium carbonate and urea, to the metallic copper containing copper chloride solution, rapidly bubbling an excess of hot air at about 80° C. therethrough, whereby tribasic copper chloride is formed in suspension in the solution according to the following reaction:

$$4CuCl_2 + 12H_2O + 6O_2 + 12Cu \rightarrow 4[CuCl_2 \cdot 3Cu(OH)_2]$$

at least 66% of said tribasic copper chloride having an average particle size below 3 microns and when the reaction according to the last stated equation has practically ceased, sodium carbonate solution is added in excess to immediately precipitate the remainder of copper chloride as tribasic copper chloride.

4. Process of preparing micronised tribasic copper chloride comprising treating tribasic copper chloride with hydrochloric acid in accordance with the following reaction:

$$CuCl_2 \cdot 3Cu(OH)_2 + 6HCl \rightarrow 4CuCl_2 + 6H_2O$$

to form copper chloride, adding water to the copper chloride so formed to obtain a solution thereof, bringing the said solution of copper chloride in contact with metallic copper and bubbling air through the solution having metallic copper in contact therewith and while the air is being bubbled adding a basic catalyst selected from the group consisting of ammonia, ammonium hydroxide, ammonium carbonate and urea to the metallic copper containing copper chloride solution, rapidly bubbling a large excess of hot air at about 80° C. therethrough, whereby micronised tribasic copper chloride is formed in suspension in the solution according to the following reaction:

$$4CuCl_2 + 12H_2O + 6O_2 + 12Cu \rightarrow 4[CuCl_2 \cdot 3Cu(OH)_2]$$

at least 66% of said tribasic copper chloride having an average particle size below 3 microns.

References Cited by the Examiner

UNITED STATES PATENTS

| 1,100,675 | 6/14 | Hackl | 23—97 X |
| 2,046,937 | 7/36 | Curtin | 23—97 X |
| 2,104,754 | 1/38 | Marsh et al. | 23—97 X |
| 2,162,091 | 6/39 | Kuss | 23—85 |
| 2,201,928 | 5/40 | Souviron | 23—85 |
| 3,554,319 | 5/51 | Ayers | 23—85 |
| 2,777,791 | 1/57 | Visor | 167—16 |
| 2,923,655 | 2/60 | Vesterman | 167—16 |

FOREIGN PATENTS

| 881,578 | 1/43 | France. |
| 323,115 | 12/29 | Great Britain. |
| 480,697 | 2/38 | Great Britain. |

OTHER REFERENCES

Hanna's Handbook of Agricultural Chemicals, pages 11, 12, 14, 18, 168 (2nd Ed. 1958), published by L. W. Hanna, Forest Grove, Oreg.

MAURICE A. BRINDISI, *Primary Examiner.*

MORRIS O. WOLK, GEORGE D. MITCHELL,
*Examiners.*